Jan. 25, 1955

C. A. SIGEL ET AL 2,700,293

LOCK FOR THE CLOSURES OF AUTOMOBILE
REAR COMPARTMENTS AND THE LIKE

Filed March 27, 1950

Inventors
Carl A. Sigel
Adam Lindner by Parker & Carter
Attorneys.

Jan. 25, 1955
C. A. SIGEL ET AL
2,700,293
LOCK FOR THE CLOSURES OF AUTOMOBILE
REAR COMPARTMENTS AND THE LIKE
Filed March 27, 1950
2 Sheets-Sheet 2
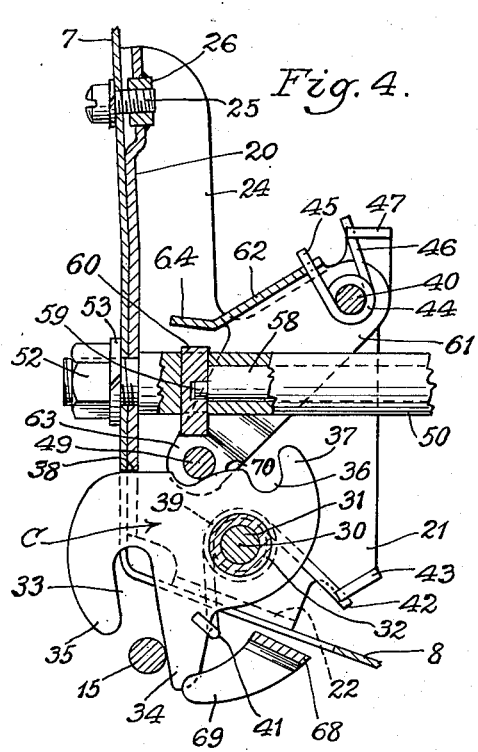
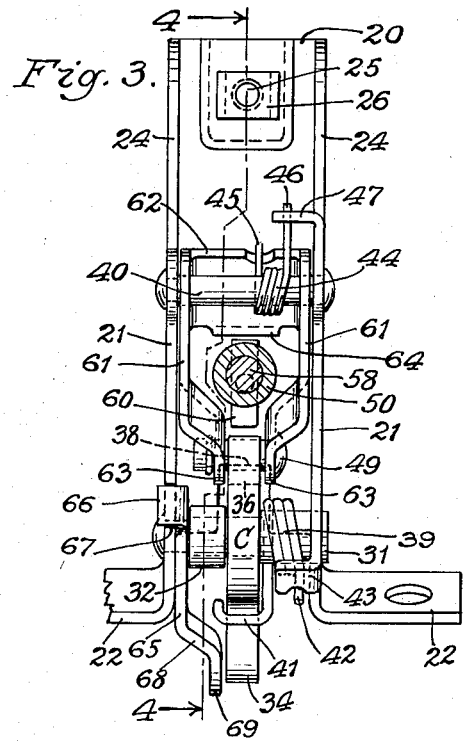
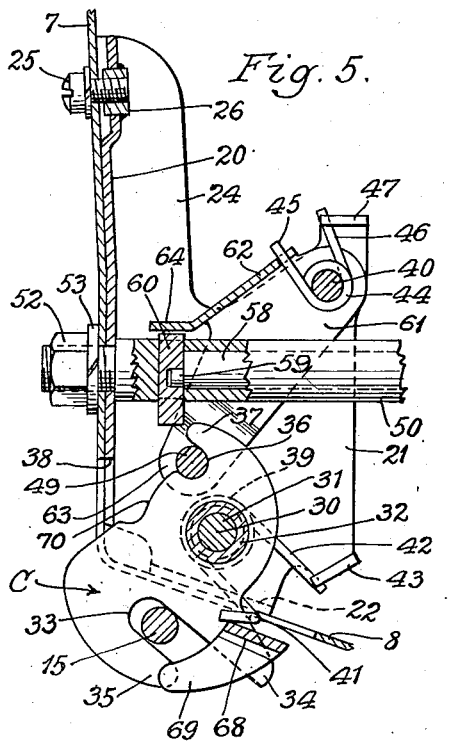
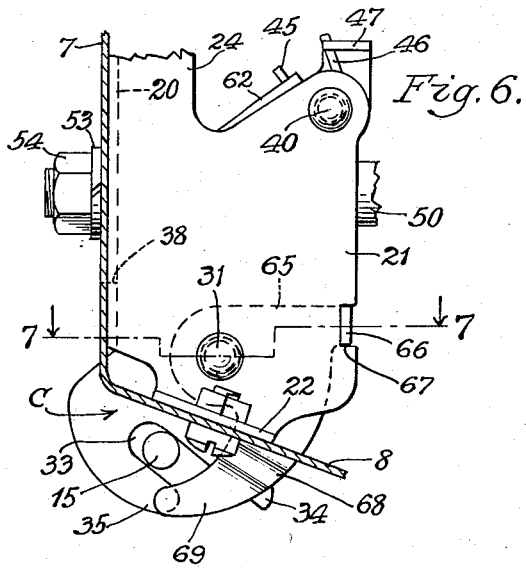
Inventors
Carl A. Sigel
Adam Lindner
by Parker & Carter
Attorneys.

United States Patent Office 2,700,293
Patented Jan. 25, 1955

2,700,293

LOCK FOR THE CLOSURES OF AUTOMOBILE REAR COMPARTMENTS AND THE LIKE

Carl A. Sigel and Adam Lindner, Chicago, Ill., assignors to Chicago Forging & Mfg. Company, Chicago, Ill., a corporation of Delaware Application March 27, 1950, Serial No. 152,144

5 Claims. (Cl. 70—156)

This invention relates to an improvement in latching or locking means, and has for one purpose to provide a latch usable with automobiles.

Another purpose is to provide a latch which is adaptable to secure the rear end or trunk closure of an automobile.

Another purpose is to provide such a latch which shall be of simple, compact structure, with a minimum of parts.

Another purpose is to provide such a latch which may readily be controlled by a key or handle, and which may be easily moved into locking position when the rear trunk door of an automobile is closed.

Other purposes will appear from time to time in the course of the specification and claims.

The invention is illustrated more or less diagrammatically in the accompanying drawings wherein:

Figure 3 is a section on the line 3—3 of Figure 2, on an enlarged scale, with the parts in unlocked position;

Figure 4 is a section on the line 4—4 of Figure 3;

Figure 5 is a similar section, illustrating the parts in the locked position;

Figure 6 is a partial side view of the latch; and

Like parts are indicated by like symbols throughout the specification and drawings.

Figure 1:
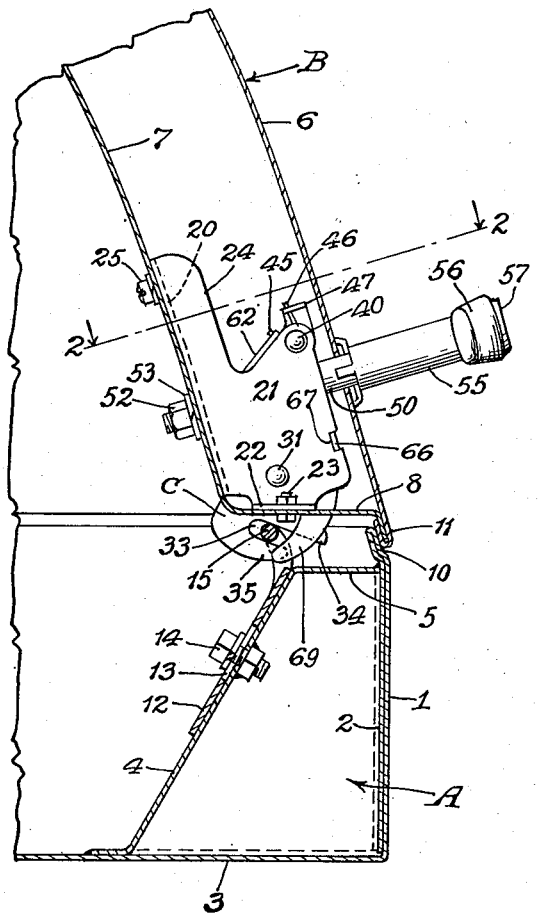
Figure 1 is a vertical sectional view of the rear end of an automobile trunk, illustrating the locked position.
Figure 2:
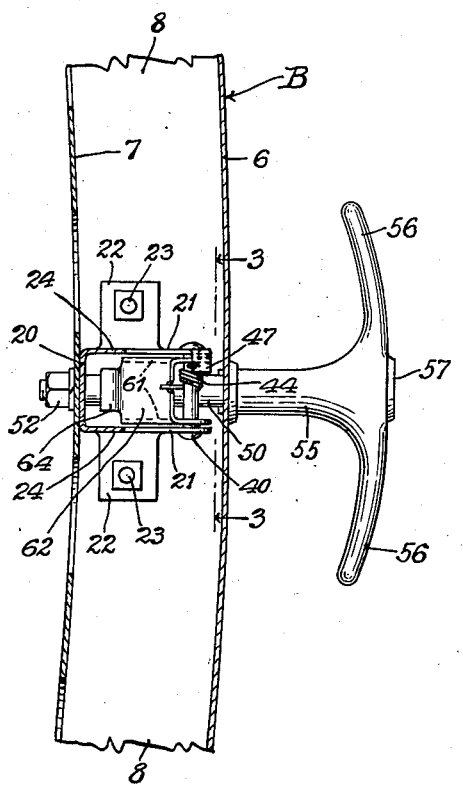
Figure 2 is a section on the line 2—2 of Figure 1.
Figure 7:
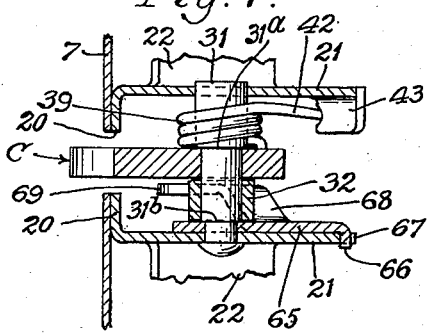
Figure 7 is a section on the line 7—7 of Figure 6.

Referring to the drawings, A generally indicates a rear end portion of an automobile body. It is shown as including a transverse sheet metal strip 1 with a recurved reinforcing layer 2. The portion 1 is secured to a bottom plate 3. An inclined plate 4, with its transverse top portion 5, constitutes, with the parts 1, 2 and 3, a transversely extending member which may be considered as forming the lower element of a door frame closed by the rear or trunk door generally indicated as B. The door includes a surface plate 6 and a spaced rear plate or portion 7, the two being connected about their edges by any suitable edge portion 8. It will be understood that the details of the door and the door frame do not, of themselves, form part of the present invention. It will be noted that the door frame has a recessed edge portion 10 to receive an opposed edge portion 11 of the door, to provide a relatively snug surface fit.

12 is any suitable plate or base, adjustably mounted on the inclined member 4 of the door frame A. It may be slotted, as at 13, to receive any suitable locking screw or locking element 14, whereby the actual keeper member or loop 15 may be suitably adjusted within an adequate but limited range of adjustment.

Positioned within the hollow of the door B, and shown as secured to the members or portions 7 and 8, is a latch base including a front member 20 provided with preferably integral side members or plates 21 which extend therefrom in parallel relationship to form a three-sided latch housing or support structure. The lower edge of each side plate 21 is provided with an outwardly extending lug or flange 22 which may be bolted, welded, or otherwise secured to the inner, upper surface of the member 8, as at 23 in Figure 1. It will be noted that each side plate has an edge portion 24 of substantially the length of the front member 20. The upper end of the front member 20 may be secured to the inner surface of the door portion 7, by any suitable means; for example, the securing screw 25 which may be screwed through any suitable nut 26 welded to the front member 20.

Mounted between the side plates 21 is the latch element, generally indicated as C, as shown, for example, in Figure 3. It has opposite parallel plane faces and is pivoted for rotation about a center 30. Any suitable pivoting means may be employed, but a pin 31 may center and support a spacing sleeve 32 loose on the pin. The latch element C is held in position between a shoulder 31a of the pin 31 and the spacing sleeve 32. An element 65 has an ear 66 positioned and adapted to extend into a notch 67 of the member 21. It is held in position by the shoulder 31b of the pin 31. The member 65 is provided, also, with an offset portion 68 terminating in a guard arm 69. As will be clear, for example, from a comparison of the position of the parts in Figures 5 and 6, as contrasted to their position of Figure 4, the guard arm 69, in effect, closes the slot 33 when the latch element C is moved to the locked position.

The latch structure includes a latching slot 33 defined by an upper projection 34 and a lower projection 35. A limiting notch 36 is defined, in part, by an outward projection 37. The latch C is biased toward the unlocked position by a spring 39 coiled about pivot pin 31. One end of the spring engages the horn or projection 34 of the latch, as at 41, and the other end, as at 42, engages a notched flange portion 43 inwardly offset from one of the side plates 21. Thus the spring 39 tends to move the latch C from the locked position in which it is shown in Figure 5 to the unlocked position as shown in Figure 4. The movement of the latch toward the unlocked position is limited by the limit stop or edge 38, whereas the movement of the latch toward locked position is limited by the notch or stop 36.

Pivoted, as at 40, is the rotatable structure which includes side plates 61 connected by a preferably integrated cross plate 62. The upper end of plate 62 serves as a stop for one end 45 of the spring 44 coiled about the pivot pin 40. The opposite spring end 46 engages a notched, inwardly turned flange 47 of one of the side plates 21. The side plates 61 have end portions 63 which are substantially closer together than the main portions 61, and, as shown, are connected by a bolt or cross-piece 49 which serves to hold the latch C in locked position by entering notch 36, as shown in Figure 5. It will be understood that the spring 44 tends normally to urge the pin 49 into contact with the opposed face of the latch C, which has the cam 70. The pin 49 rides up over the cam 70 as the keeper 15 forces the upper projection 34 and the latch C to rotate counterclockwise.

Positioned between the side plates 61 is the stub shaft 50 which extends outwardly between the side plates 21. The stub 50 may be held in position, for example, by any suitable nut 52 and lock washer 53 which abut against the lower surface of the bottom plate 20, or which may actually thrust against the inner surface of the door component 7. The stub shaft 50 is hollow and has secured to its outer end the handle component 55 with its cross handle portions 56. Rotatable within the handle 55 is a lock element 57 formed to receive any suitable key, not shown. This lock element 57 is secured to, or has associated with it, a rotatable stem 58 having, at its lower end, an eccentric downward projection 59 which enters an actuating aperture in a slide 60. The slide 60 is movable in response to the rotation of the member 57 and the rod 58, to urge the slide 60 to releasing position. When the parts are in the locked position, as shown in Figure 5, the slide 60 is in extended position in engagement with the projection 64.

Assume that the invention is applied to the rear or trunk door of an automobile, such as is shown in Figure 1, the door cannot be opened until the latch C has been moved to the released or unlocked position of Figure 4. The door can then be lifted to the open position and held there by any suitable means, such means not herein shown, and which do not form part of the present invention. When the operator lowers the door to the closed position the latch projection 34, which is held in the Figure 4 position by the spring 39, is rotated by contact with the fixed abutment or keeper 15 and is moved to the locked position of Figure 5. The above-described structure, with its spring 44, normally holds the abutment or pin 49 against the opposite face of the latch C. When the projection 34 is forced against the keeper 15 by the movement of the door, the latch C is caused to rotate counterclockwise and the pin 49 is caused to ride up over the cam 70. Thus the closure of the door is restrained by the force of both yielding springs 39 and 44 and injury to the members 10, 11 is prevented. This means, whereby the force of both small springs 39 and 44 is utilized, permits the compact simple structure all within the housing 20, 21. When the parts are in the unlocked position of Figure 4, the back of latch C engages the end 38 of the member 20, in response to action of the spring 39. However, when the latch is moved to the locked position of Figure 5, the same spring 39 is effective to hold the latch locked by maintaining a locking contact between the pin or abutment 49 and the notch 36. The outward projection 37 serves to limit the movement of the latch C in response to the closure of the door and the resulting pressure of the keeper 15 against the upper projection 34, and locks the closure members thus preventing injury to the members 10, 11 by limiting the approach of one to the other.

When the operator wishes to release the latch C to the unlocked position he has only to rotate the key in the lock element 57 of the handle 56. The result is to move the slide 60 upwardly, referring to the position of the parts in Figures 4 and 5. The slide 60 then engages the end 64 of the plate 62 and moves the side plates 61 about the pivot 40 against the action of the spring 44. This withdraws the pin or abutment 49 and permits the spring 39 to rotate the latch C to the unlocked position of Figure 4, its clockwise rotation being limited by the abutment or notch 38.

It will be understood that any suitable means, not herein shown, such as a spring within the hollow portion of the shaft 50, may be used for biasing the lock or key controlled member 58 to the position in which it is shown in Figures 4 and 5, with the slide 60 in operative position. In other words, when the user inserts a key in the lock portion 57 and rotates it to move the slide upwardly, referring to the position of the parts in Figures 4 and 5, he operates against a weak spring which returns the eccentric 59 and the slide 60 to the inoperative position, after the operator releases or removes the key from the member 57.

It will be realized that whereas we have described and claimed a practical and operative device, nevertheless, many changes may be made in size, shape, number, and disposition of parts without departing from the spirit of the invention. We wish, therefore, that our description and drawings be taken as in a broad sense illustrative and diagrammatic, rather than as limiting the invention to the precise showing of the present disclosure. For example, whereas the invention is a practical solution of the problem of locking a rear or trunk door of an automobile, it may be applied to the solution of other door or closure locking problems.

We claim:

1. In a latch assembly for relatively movable members in which a normally fixed keeper is mounted on one such member and a latch element is movably mounted on the other, a housing mounted on one such member, a handle on said last named member having a portion extending within said housing, a latch element pivotally mounted in said housing and having a projection extending outwardly from said housing and adapted to engage the keeper on the other member in response to relative movement of the members, the latch element being movable about its pivot to locking position, a latch control member pivotally mounted in said housing and yielding means for normally urging it against the latch element, and means for releasing said control member from engagement with said latch element including a manually rotatable portion on said handle extending from a point on said handle outside said last named member and said housing to a point within said housing and adjacent said control member, and a camming connection between said manually rotatable portion and said control member comprising an eccentric slide formed and adapted to be urged against said control member in response to rotation of said rotatable handle portion through a distance sufficient to move said control member out of engagement with said latch element.

2. In a latch assembly for the closure of an automobile rear compartment, a housing adapted to be secured to such a closure, a handle having a portion manually rotatable in said housing about an axis generally perpendicular to said closure, a latch element pivotally mounted in said housing for rotation about an axis perpendicular to the axis of rotation of said handle portion, said latch element having a projection extending outwardly from said housing and adapted to engage a keeper on the automobile in response to movement of the closure toward closed position, the latch element being thereby rotatable about its pivot to locking position, the latch element having also a locking slot adjacent the edge of such projection furthest removed from said housing, said locking slot being formed and adapted to receive a keeper on the automobile in locking relationship in response to rotation of the latch element about its pivot, a control member pivotally mounted in said housing for rotation about an axis parallel with the axis of rotation of said latch element and perpendicular to the axis of rotation of said handle portion, an abutment on said control member, yielding means formed and adapted to urge said abutment against an edge of said latch element remote from said projection and locking slot, yielding means adapted normally to urge said edge toward said abutment and to urge said latch element toward unlocked position, said edge having a cam formed and adapted to be overridden by said abutment and a notch adjacent said cam formed and adapted to receive said abutment when said latch element is rotated to rocking position, and means for releasing said abutment from said notch, including a camming connection between said rotatable handle portion and said control member.

3. The structure of claim 2 characterized by and including a guard mounted on and extending outwardly from said housing adjacent said projection and adapted to close the slot in the latch element when the latch element is in locking position.

4. The structure of claim 2, wherein the means for releasing said abutment from said notch includes a release member connected to the handle and having a camming connection with said control member, and means for urging it against said control member in response to rotation of the rotatable portion of the handle, through a distance sufficient to move the abutment out of the notch in the edge of the latch element.

5. The structure of claim 2 in which the means for releasing said abutment from said notch comprises a slide mounted on said handle and having an actuating slot therein, a stem rotatably mounted in said handle, an eccentric downward projection on the end of said stem formed and adapted to enter said actuating aperture in said slot, and a lock element extending outwardly from said housing and connected to said stem.

References Cited in the file of this patent

UNITED STATES PATENTS

| 307,281 | Farrar | Oct. 28, 1884 |
| 600,047 | Steelman | Mar. 1, 1898 |
| 1,544,960 | Watts | July 7, 1925 |
| 1,789,775 | Russ et al. | Jan. 20, 1931 |
| 2,094,413 | Schonitzer | Sept. 28, 1937 |
| 2,228,674 | Raymond | Jan. 14, 1941 |
| 2,304,145 | Borchers | Dec. 8, 1942 |
| 2,508,090 | Beems et al. | May 16, 1950 |

FOREIGN PATENTS

| 394,833 | Great Britain | July 6, 1933 |